United States Patent [19]

Alexanderson et al.

[11] Patent Number: 4,597,802

[45] Date of Patent: Jul. 1, 1986

[54] LEVELING COMPOSITION

[76] Inventors: Johan Alexanderson, Tegnérgatan 7, S-111 40 Stockholm; Åke Skarendahl, Emblavägen 4, S-182 63 Djursholm, both of Sweden

[21] Appl. No.: 598,917

[22] Filed: Apr. 10, 1984

[30] Foreign Application Priority Data

Apr. 19, 1983 [SE] Sweden .................................. 8302202

[51] Int. Cl.$^4$ ................................................ C04B 7/00
[52] U.S. Cl. ...................................... 106/315; 106/97; 106/98
[58] Field of Search .......................... 106/315, 97, 98

[56] References Cited

U.S. PATENT DOCUMENTS

| | | | |
|---|---|---|---|
| 2,339,163 | 1/1944 | Friedlaender et al. | 106/104 |
| 2,673,810 | 3/1954 | Ludwig | 106/315 |
| 3,210,207 | 10/1965 | Dodson et al. | 106/315 |
| 3,429,724 | 2/1969 | Keenum et al. | 106/315 |
| 3,600,203 | 8/1971 | Aldera | 106/104 |
| 3,663,286 | 5/1972 | De Barrau | 106/315 |
| 3,826,665 | 7/1974 | Hovasse et al. | 106/315 |
| 3,922,172 | 11/1975 | Crinkelmeyer et al. | 106/315 |
| 3,947,398 | 5/1976 | Williams | 524/5 |
| 4,075,374 | 2/1978 | Jorgenson et al. | 106/90 |
| 4,313,763 | 2/1982 | Turpin, Jr. | 106/98 |
| 4,394,175 | 7/1983 | Cheriton et al. | 106/98 |

FOREIGN PATENT DOCUMENTS 2421152 11/1979 France .

Primary Examiner—William R. Dixon, Jr.
Assistant Examiner—Ann Knab
Attorney, Agent, or Firm—Burns, Doane, Swecker & Mathis

[57] ABSTRACT

Building material based on hydraulic binder and ballast in the form of a levelling compound intended to be applied to an uneven support. The building material contains a salt which does not essentially effect the strength of the material and is present in such an amount and has such capacity as to reduce the relative equilibrium moisture of the gas phase of the material before drying out to a level of less than about 95%.

14 Claims, No Drawings

LEVELING COMPOSITION

The present invention relates to building materials based on hydraulic binders and ballast.

Most of the presently available floor covering materials are in one way or the other sensitive to moisture. Many of these materials swell under the influence of moisture, e.g. materials based on polyvinyl chloride (PVC), linoleum and cork. Since the interface whereby the materials are held to the support can be weakened by the saponification resulting from moisture load there is great risk for the formation of blisters and edge rising. Parquetry which swells under the influence of moisture can bend or sag or be subjected to dimensional changes in other ways. Other types of moisture damages of floor materials are discolouration, e.g. of cork, degradation of plasticisers in the coatings of PVC under the formation of obnoxious gases and the formation of moulds in carpets having an organic backside of e.g. jute felt.

A significant source of moisture load on the floor coating is the moisture found in the support, mainly concrete, so-called building moisture. In order to avoid floor damages of the above-mentioned types drying out of the concrete to a certain extent before laying the floor will be required. Since the drying out takes place from the surface of the support said surface is usually well dried out when the floor coating is applied. However, further down in the support a higher moisture content is found, and if the surface coating is airtight, which holds for most modern floor materials, e.g. PVC, the moisture in the interior of the support will be redistributed and the moisture may thus increase under the airtight floor material. It is the moisture prevailing after the redistribution that may be so high as to cause damage to the floor coating. The relative humidity is decisive and each floor material has a critical relative humidity, $RH_{crit}$. For many materials $RH_{crit}$ is of the order of 90%.

In the present disclosure reference is often had to supports made of concrete. However, the invention is not limited to such supports but may be applied to all types of supports which may contain moisture. Particularly, reference is had to supports based on hydraulic binders and ballast.

In order to obtain drying of the concrete support resulting in a relative humidity below an airtight surface coating of about 90% there will be required a drying period of the order of 2 months for a 100 mm concrete slab placed on the ground or a 200 mm suspended slab of a normal concrete quality. This drying period is a disadvantage not only in regard to the delay it causes but it also constitutes considerable costs in view of the energy requirement.

One way of shortening this drying period is to apply a so-called moisture barrier before applying the floor coating, and such barrier may be constituted by at least two coatings using a plastic dispersion, usually based on Polyvinylidene Chloride. This way of solving the problem is, however, subject to the disadvantage that the vapour penetration of the applied moisture barrier increases considerably at higher moisture levels in view of which there is yet a certain need for drying even if reduced compared to the case where no moisture barrier has been applied. Moreover, the application of the moisture barrier constitutes a further operational step with concomitant increased costs. Moisture barriers of this type are, moreover, subject to the disadvantage that gluing of the carpet will be rendered more difficult since the support is no longer breathing.

The present invention has for an object to provide a technique whereby the above-mentioned disadvantages are eliminated or at any rate essentially reduced. Another object of the invention is to provide a technique whereby drying of the support as well as applying of a moisture barrier of the above-described type can be avoided. Yet another object of the invention is to provide this without resorting to any new operational step.

In accordance with the present invention there is thus provided a building material based on hydraulic binder and ballast in the form of a levelling compound intended to be applied to an uneven support, said building material being characterized by containing a salt which does not substantially affect the strength of the material and which is present in such an amount and has such capacity that the relative equilibrium humidity in the gas phase of the material before drying out is reduced to a level of less than about 95%. By adding such vapour pressure reducing salt to the building material the inconveniences associated with the moisture content of the material resulting in adverse effect on the floor coating material applied to the building material are avoided or essentially reduced.

In principle any salt can be used which has the ability of lowering the vapor pressure, the only further requirement being that the salt addition must not result in substantial change of the strength of the material or its other properties. Among useful salts there may be mentioned lithium halides, calcium bromide, calcium iodide, potassium nitrite, potassium formate and potassium propionate. Of these salts the lithium halides are particularly preferred, especially lithium chloride. The latter has been found particularly suitable from a technical as well as economic point of view, inter alia depending on its low molecular weight which means that relatively moderate dosages result in significant reduction of the relative humidity.

The dosage of the salt is determined by the lowering of the vapour pressure which is required in view of the $RH_{crit}$ of the floor material. Quite generally it can be said that it is preferred to use such a small quantity of salt as to reduce the relative equilibrium moisture content to a level of less than about 90%. The necessary quantity of salt is generally within the range of about 0.5 to about 5% by weight, particularly about 1 to about 3% by weight. A suitable lower limit is about 1% by weight.

A particularly preferred application of the technique of the present invention is to add the vapour pressure reducing salt to building materials which constitute so-called levelling layers which usually are applied to conventional concrete supports to result in a surface which is sufficiently smooth and even to enable laying of a floor coating. Usually there is used for this purpose so-called levelling compounds.

When a concrete support dried out only adjacent to the surface thereof is smoothed with such a levelling layer containing a vapour pressure reducing salt in accordance with the invention it is found by later application of an airtight surface-layer, e.g. of PVC, that the relative humidity below said surface-layer will be determined by the salt in spite of a high moisture-content of the concrete. One can say that the levelling layer constitutes a moisture barrier without resulting in the disadvantages associated with conventional moisture barriers as previously described. As time passes the concrete will dry out in the downward direction in view of which by applying the technique of the invention one does not build more moisture into the house than would otherwise have been the case.

The technique according to the present invention is simple to apply and the selected vapour pressure reducing salt is mixed in the most expedient manner in the building material in connection with its preparation. In practise it has been found that the salt need not be used in larger amounts than amounts not negatively affecting the building material. It is particularly suprising that the characteristics of the levelling layer are not significantly affected by the additional salt.

The invention will in the following be described by non-limiting examples.

EXAMPLE 1

A support of conventional concrete was allowed to dry for a few days so as to dry its surface. Then there was applied a commercially available smoothing compound (ABS 146, a product from Allmän Byggnadsservice AB, Stockholm, Sweden), containing cement, sand, supplementing binder and additives normally used in cement and concrete construction to which had been added 1% by weight of lithium chloride based on the solids content of the smoothing compound. The water added to the compound preparation was 22%, this also based on the dry weight. The flowability of the compound was sufficient to obtain satisfactory evenness of the smoothing layer which was applied to a thickness of about 10 mm.

After two days from the application of the smoothing compound an airtight carpet of polyvinyl chloride was glued to the surface. The concrete was not given any possibility to dry out in any other direction.

After 14 days a hole was cut out of the PVC-carpet and a tube was attached by gluing so as to enable measuring of the relative humidity immediately below the carpet. The obtained value of the relative humidity was about 88%.

A similar test but without adding vapour pressure reducing salt in the smoothing compound gave a relative humidity below the PVC-carpet close to 100%.

EXAMPLE 2

The process according to Example 1 was repeated but while adding 2% by weight of lithium chloride. The relative moisture in this case was about 80%.

EXAMPLE 3

The process according to Example 1 was repeated but in this case lithium bromide in an amount of 3% by weight of the dry weight of the smoothing compound was used. In this case the relative moisture was about 76%.

EXAMPLE 4

The procedure of Example 1 is repeated but using 4% by weight of lithium chloride. The relative humidity is about 70%. The flowability is reduced using this salt addition so that manual smoothing will be required.

We claim:

1. A levelling composition based on hydraulic binder, a levelling compound and ballast to be applied to an uneven moisture-containing support, containing a salt which does not essentially affect the strength of the composition when set and which is present in such an amount and has such capacity as to reduce the relative equilibrium humidity in the gas phase of said composition before drying to a value of less than about 95%, said salt being selected from the group consisting of lithium halides, calcium chloride, calcium bromide, calcium iodide, potassium nitrite, potassium formate, and potassium propionate, and mixtures thereof, and being present as an amount in the range of from about 0.5 to about 5 weight percent of the dry contents of said composition.

2. A levelling composition according to claim 1, wherein said salt is present in such an amount that the relative equilibrium humidity is reduced to a value of less than about 90%.

3. A levelling composition according to claim 1, wherein said salt is present in the said composition in an amount of about 1-5% by weight.

4. A levelling compound according to claim 1, wherein said salt is lithium chloride.

5. A levelling composition according to claim 4, wherein the lithium chloride is present in an amount of about 1-5% by weight.

6. A levelling composition according to claim 1, whereby said salt is present in an amount in the range of from about 1 to about 3 weight percent.

7. A levelling composition according to claim 1, wherein said salt is at least one of calcium chloride, calcium bromide or calcium iodide.

8. A levelling composition according to claim 1, wherein said salt is at least one of potassium nitrite, potassium formate or potassium propionate.

9. A process of applying a levelling composition based on hydraulic binder, a levelling compound and ballast to an uneven moisture-containing support, wherein said composition contains an amount of a salt effective to reduce the relative equilibrium humidity in the gas phase of said composition before drying to a value of less than about 95% without essentially affecting the strength of said composition when set.

10. A process according to claim 9, wherein said uneven support is a concrete.

11. A process according to claim 9, wherein said salt is selected from the group consisting of lithium halides, calcium chloride, calcium bromide, calcium iodide, potassium nitrite, potassium formate, and potassium propionate, and mixtures thereof, and being present as an amount in the range of from about 0.5 to about 5 weight percent of the dry contents of said composition.

12. A process according to claim 9, wherein said salt is present in an amount in the range of from about 0.5 to about 5 weight percent of the dry contents of said composition.

13. A process according to claim 9, wherein said levelling composition contains cement, sand, a supplementing binder, and other additives normally used in cement and concrete compositions.

14. A process according to claim 1, wherein said levelling composition contains cement, sand, a supplementing binder, and other additives normally used in cement and concrete compositions.

* * * * *